United States Patent [19]

Alsina

[11] 4,142,299
[45] Mar. 6, 1979

[54] COLLAPSIBLE ALIGNMENT APPARATUS FOR AUTOMOTIVE VEHICLES

[75] Inventor: Pierre A. Alsina, Rochester, N.Y.

[73] Assignee: Spin Optic, Honeoye, N.Y.

[21] Appl. No.: 859,547

[22] Filed: Dec. 12, 1977

[51] Int. Cl.² ............................................. G01B 11/275
[52] U.S. Cl. .................................. 33/288; 33/203.13; 33/299; 33/DIG. 21; 356/155
[58] Field of Search ...... 33/180 AT, 181 AT, 203.12, 33/203.13, 203.14, 203.15, 203.16, 288, 335, DIG. 21, 263, 289, 299; 356/155

[56] References Cited

U.S. PATENT DOCUMENTS

| 3,003,246 | 10/1961 | Carrigan et al. | 33/203.12 |
|---|---|---|---|
| 3,758,213 | 9/1973 | MacPherson et al. | 33/203.13 |
| 3,876,310 | 4/1975 | Berndt | 365/155 |
| 3,951,551 | 4/1976 | MacPherson | 365/155 |

FOREIGN PATENT DOCUMENTS

1524407  4/1968  France ........................................ 33/288

*Primary Examiner*—Richard R. Stearns
*Attorney, Agent, or Firm*—Shlesinger, Fitzsimmons & Shlesinger

[57] ABSTRACT

Two rectangular housings are mounted in a pair of spaced recesses in a garage floor to have cover means thereon moved to closed positions flush with the floor surface. Mounted in one end of each housing beneath a first cover is a rotatable wheel-supporting pad, which is slidable longitudinally of the housing, and is reciprocable vertically by a pneumatically operated scissors jack. Each housing has pivoted on its opposite end a second cover which carries on its inside surface a laser, a mirror, and a conventional alignment chart for denoting toe in, toe out, camber, etc., all of which items are disposed within one section of the housing when the pivotal cover is closed. When the pivotal covers are swung to upright positions, each laser directs a beam of light upwardly onto the associated mirror, which is inclined at 45° to the vertical, so that the mirrors direct their beams horizontally through an aperture in the center of the associated chart and coaxially toward one another. The lasers, mirrors and charts are adjustably mounted on their respective pivotal covers so that the beams of light can be properly focused. The apparatus is particularly suited for use with a garage bay of the type having a lift for engaging the frame of an auto to raise and lower the latter.

17 Claims, 10 Drawing Figures

COLLAPSIBLE ALIGNMENT APPARATUS FOR AUTOMOTIVE VEHICLES

This invention relates to alignment apparatus for aligning the front wheels of automotive vehicles and the like, and more particularly to floor-mounted alignment apparatus which is collapsible or foldable into an inoperative position in which it is completely stored below the level of a garage floor, or the like.

Most known alignment apparatus for aligning the front wheels of automotive vehicles is rather large and cumbersome, and usually takes up a great deal of floor space, whether or not in use. Moreover, in the case of more accurate and sophisticated apparatus of the type which utilizes reflected light beams for aligning purposes, care must be taken to prevent accidental jarring or bumping of the structures which support the light sources and charts that are employed for alignment purposes.

For example, in the case of some known alignment apparatus, the front wheels of a vehicle are adapted to be positioned between two spaced light sources, such as lasers, which direct beams of light onto mirrors that are mounted on the front wheels of the vehicle to reflect beams of light back toward alignment charts that are positioned adjacent the light sources. For proper operation of such apparatus it is essential that the beams emanating from the two light sources be aligned horizontally and coaxially of one another. Any accidental bumping of the supporting devices for the beams, either when in use or not in use, may cause misalignment of the beams. As a consequence, it is necessary frequently to calibrate or adjust the equipment so that the laser beams, charts, etc. are in proper positions before any alignment operations can be effected on the automotive vehicle.

It is an object of this invention, therefore, to provide improved alignment apparatus which requires substantially less space than prior such equipment, when in use, and also is capable of being readily stored to protect the equipment from being damaged or misaligned, when not in use.

It is an object of this invention also to provide collapsible alignment apparatus which is particularly suitable for use with a garage of the type which utilizes lifts of the frame-engaging type, so that the vehicle which is to have its front wheels aligned may be elevated and lowered by the lift relative to the collapsible apparatus disclosed herein.

Another object of the invention is to provide alignment apparatus of the type described wherein it is movable selectively between a collapsed position in which substantially all of the apparatus is enclosed within a space in the surface of the floor of a garage, or the like, and an erected position in which the apparatus is automatically located in a proper operating position, ready to check the alignment of a vehicle.

Still another object of the invention is to provide apparatus of the type described which is substantially more compact and easier to operate than prior such equipment.

A further object of this invention is to provide alignment apparatus of the type described which has improved means for calibrating the apparatus to place its light sources in proper position, when necessary, prior to effecting any alignment operation.

A further object of this invention is to provide apparatus of the type described which contains scissor-type jack means for supporting the front wheels of a vehicle to provide ready access to the wheels during adjustment thereof.

Other objects of the invention will be apparent hereinafter from the specification and from the recital of the appended claims, particularly when read in conjunction with the accompanying drawings.

Figure 2:
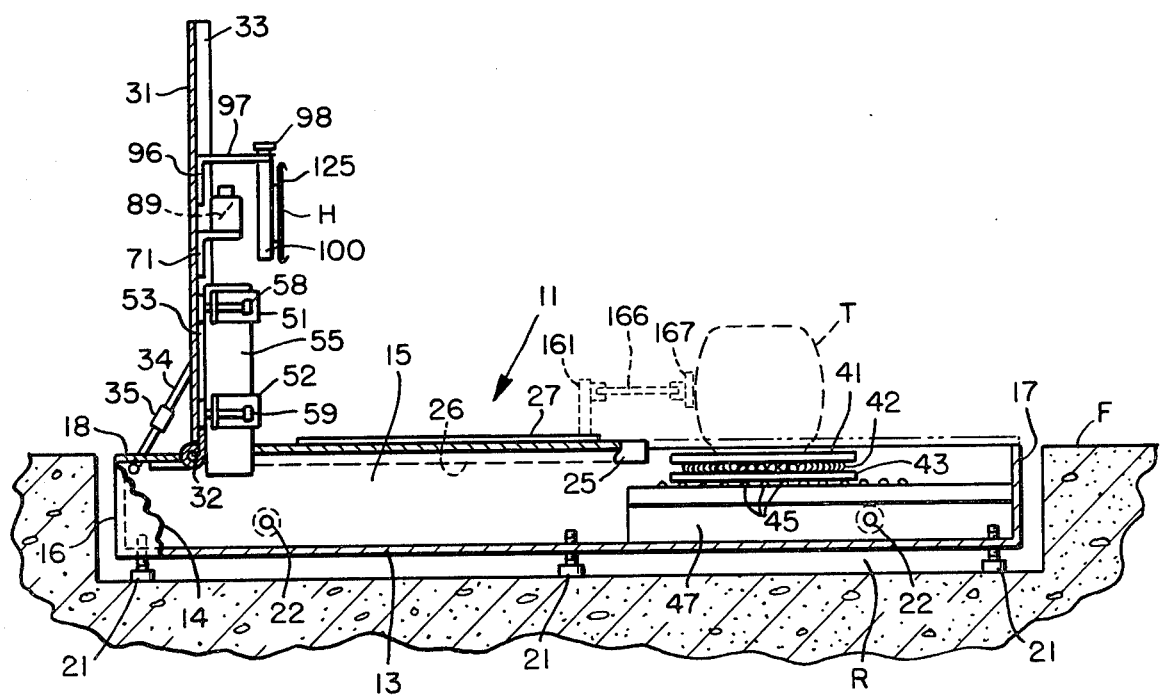
FIG. 2 is a side elevational view of this housing mounted in a recess in the floor of a garage, or the like, with one side of the housing cut away in part, and with the pivotal cover section of the housing shown in its elevated or operative position.
Figure 3:
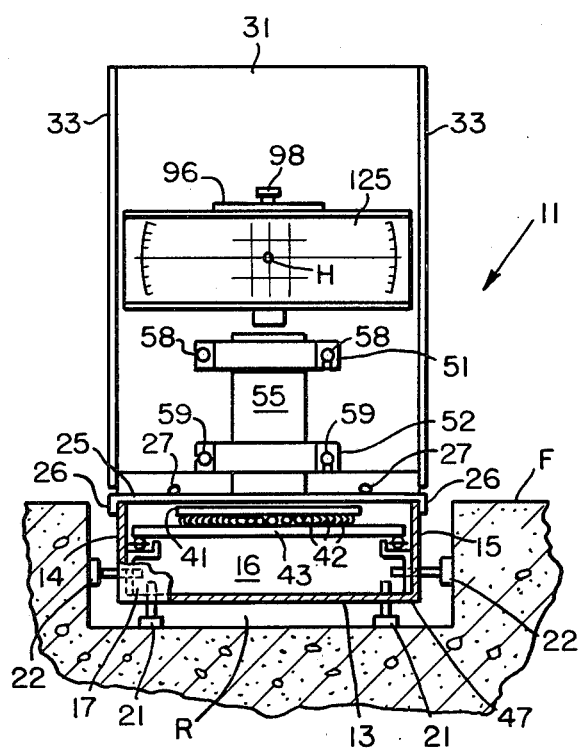
FIG. 3 is an end elevational view of this housing as shown in FIG. 2, but with part of one end wall of the housing cut away and shown in section.
Figure 7:
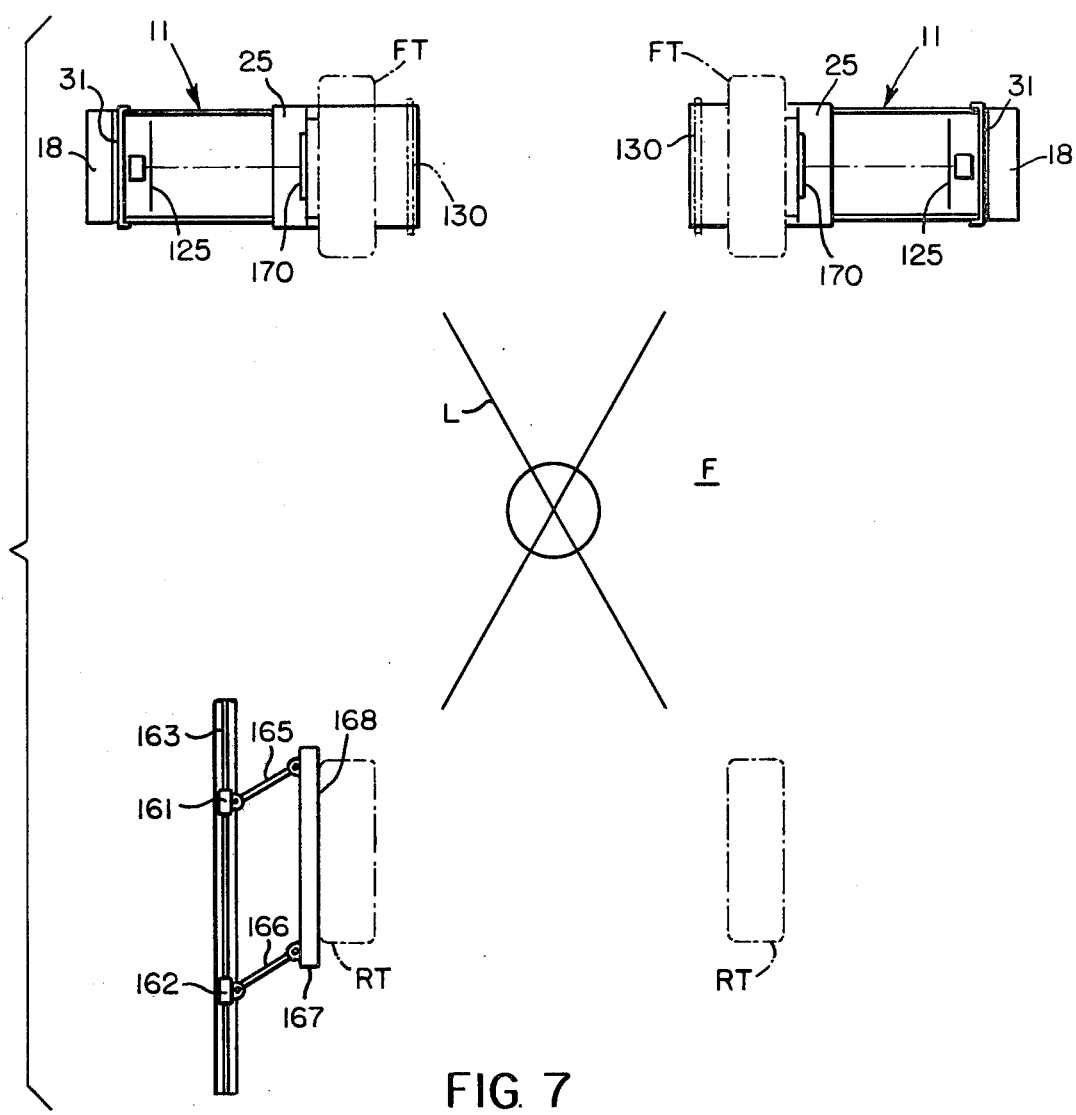
Figure 8:
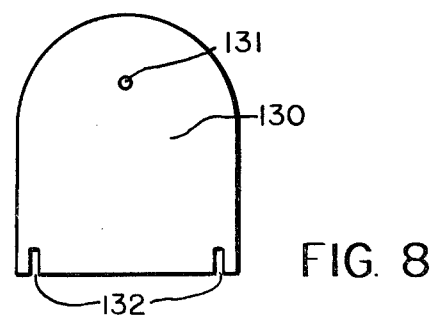
Figure 9:
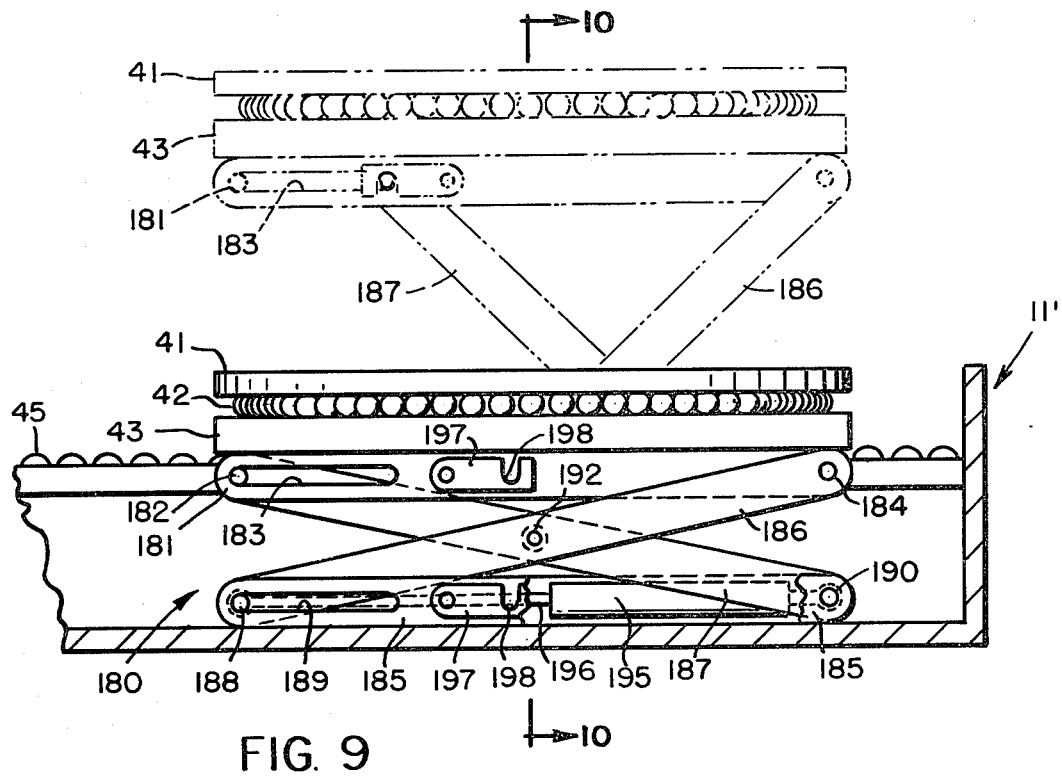
Figure 10:
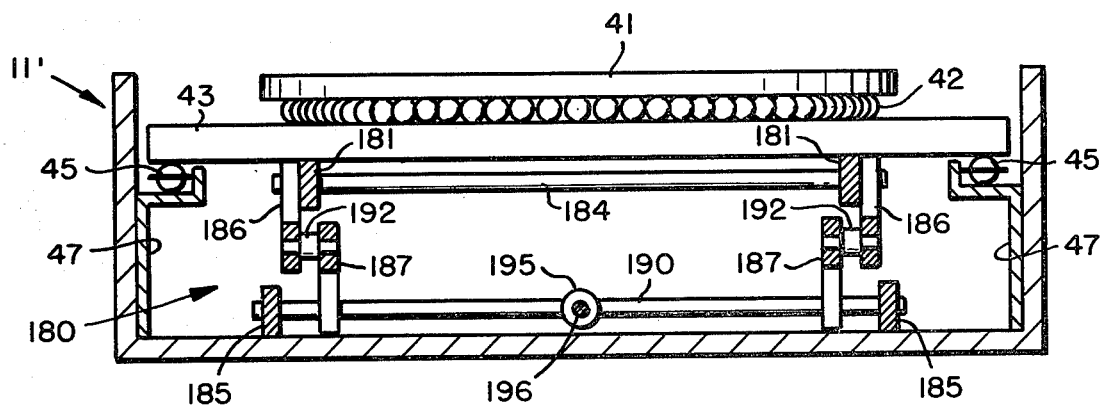

FIG. 7 is a schematic plan view showing how a pair of these housings are adapted to be employed during the alignment of the front wheels of an automotive vehicle, the four wheels of the vehicle being shown in phantom by broken lines in this figure; and FIG. 8 is a front elevational view of a fixture which is adapted to be employed during the calibration of the lasers which form part of the equipment disclosed herein;

FIG. 9 is an enlarged, fragmentary sectional view of part of the housing shown in FIG. 2, but showing a modified form of wheel-supporting pad; and FIG. 10 is a fragmentary sectional view taken along the line 10—10 in FIG. 9 looking in the direction of the arrows.

Referring now to the drawings by numerals of reference, and first to FIGS. 1 to 3, 11 denotes generally a rectangular alignment housing, which is adapted to be mounted in a rectangular recess R in the floor F of a garage, or the like. The housing 11, which may be constructed of heavy gauge metal, comprises a plane bottom wall 13, spaced, parallel side walls 14 and 15, spaced, parallel end walls 16 and 17, and a partial upper wall 18, which extends between side walls 14 and 15 adjacent end 16 of the housing. As shown more clearly in FIGS. 1 and 2, the wall section 18 covers only a small part of the upper end of housing 11.

Threaded into the bottom 13 of housing 11 are a plurality (six in the embodiment illustrated) of adjustable leveling nuts 21, having enlarged, circular heads which rest on the bottom of recess R to support the housing horizontally. Additional adjusting nuts 22 are threaded into the side walls 14 and 15 (FIG. 3) of the housing for engagement with the sides of the recess R to secure housing 11 against lateral movement in the recess.

Figure 1:
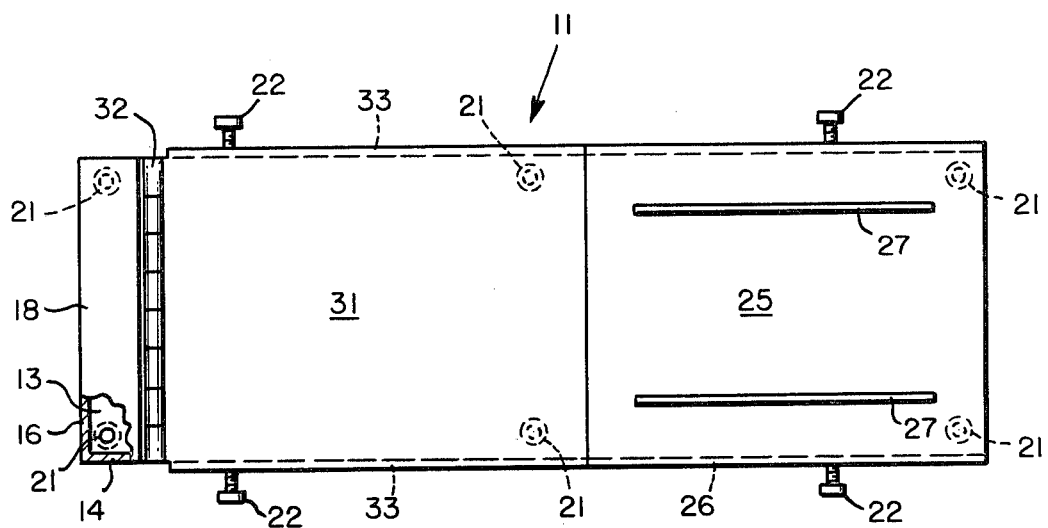
FIG. 1 is a plan view of one of the two equipment housings which form part of the apparatus made according to one embodiment of this invention, a portion of the housing being broken away and shown in section for purposes of illustration.

Slidably mounted on housing 11 adjacent its ends remote from cover section 18 is a rigid plate 25, which has downwardly projecting side flanges 26 that slidably overlap opposite sides of the housing to guide plate 25 for sliding movement between a covering position as shown by solid lines in FIG. 1 and by broken lines in FIG. 2, and an open position to the left of its closed position as shown by solid lines in FIG. 2. On its face plate 25 has two, upstanding, parallel ribs 27 for a purpose noted hereinafter.

Figure 4:
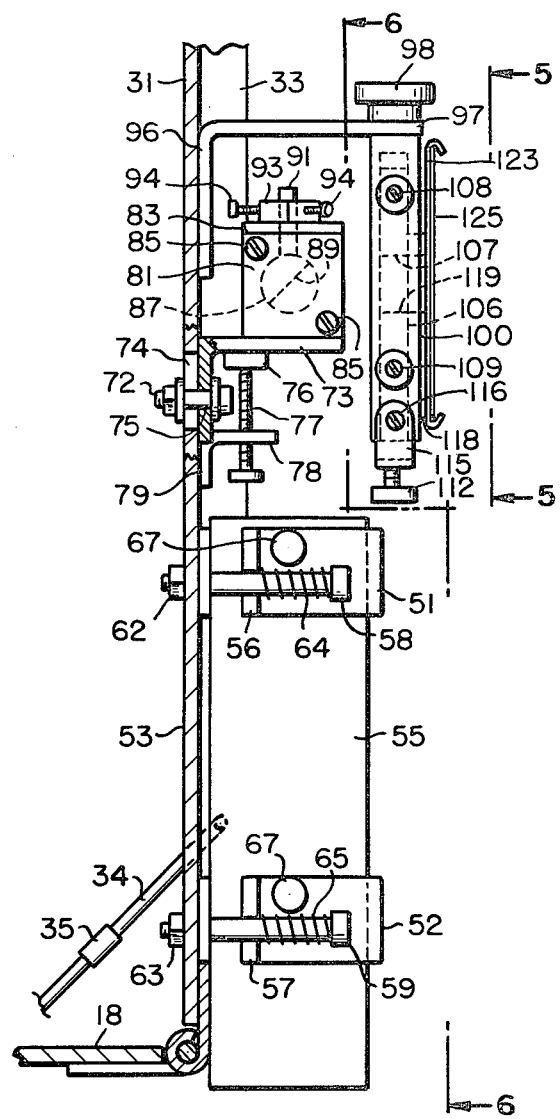
FIG. 4 is an enlarged, elevational view of the pivotal cover section of this housing as it appears in its erected position as shown in FIG. 2, but with portions of the cover cut away and shown in section.

Mounted to pivot on housing 11 between plate 25 and the stationary cover section 18 is a combination cover and laser supporting plate 31 (FIGS. 1-4 and 6), which is generally rectangular in configuration. Plate 31 is hinged as at 32 along one edge to the stationary wall section 18, so that when plate 25 is in its closed position (FIG. 1), cover 31 can be swung about its hinge 32 between a horizontal, closed position (FIG. 1) in which it combines with cover section 18 and the plate 25 completely to close the upper end of housing 11, and an erected or operative position (FIGS. 2-4 and 6) in which it is disposed vertically. Cover 31 has opposed, side flanges 33, which overlap opposite sides of housing 11 when the cover is in its closed position. To fix the cover 31 in its upright position one or more locking members 34 (FIGS. 2 and 4) can be utilized. Each member 34 may comprise a pair of cylindrical rods having adjacent ends thereof threaded into a turnbuckle 35, and having hooks on the opposite ends thereof which are engageable in openings formed in the side of housing 11, and the adjacent side flange 33 of the cover 31.

Mounted in housing 11 to be positioned beneath the plate 25, when the latter is in its closed position, is a rotatable wheel support 41 (FIGS. 2 and 3), which is circular in configuration. In its underside plate 41 has a circular groove in which are seated the upper portions of a plurality of roller bearings 42, the lower portions of which are seated in a registering, circular groove as formed in the upper surface of a rectangular support plate 43, which extends transversely between opposite sides of housing 11. Plate 43 is supported along its marginal side edges on two sets of roller bearings 45, which are seated in parallel grooves formed along opposite sides of housing 11 by a pair of right-angular brackets 47 that are secured to the inside surfaces of the housing walls 14 and 15. This construction permits plate 43 to be shifted on the bearings 45 longitudinally of housing 11, or selectively toward the left or right in FIG. 2. Likewise the bearings 42 permit the plate 41 to be rotated relative to plate 43 in a horizontal plane, and about a vertical axis through the center of plate 43.

Adjustably secured by a pair of U-shaped brackets 51 and 52 (FIGS. 2-4 and 6) against a spacer plate 53 (FIG. 4), which is fastened to the underside of the cover plate 31 adjacent its hinge 32, is a laser 55. The legs of each bracket 51 and 52 are spaced from one another a distance slightly greater than the width of the laser 55; and on their inner ends the bracket legs have outwardly projecting flanges 56 and 57, respectively. Two pairs of adjusting bolts 58 and 59 extend intermediate their ends through slots 60 and 61 (FIG. 6) in flanges 56 and 57, respectively, and through registering openings in the cover plate 31, where nuts 62 and 63 (FIG. 4) are secured over the terminal ends thereof to prevent their withdrawal from plate 31. Coiled compression springs 64 and 65 (FIG. 4) surround the bolts 58 and 59, respectively, between the heads thereof and the associated flanges 56 and 57, respectively, thereby resiliently to urge the closed ends of the brackets 51 and 52 against the outer surface of laser 55 so that the latter is held frictionally in place on the cover 31 against the spacer plate 53. To hold the laser 55 in a laterally-adjusted position between the legs of brackets 51 and 52 four adjusting bolts 67 (FIGS. 4 and 6) are threaded through the bracket legs to engage opposite sides of the laser 55 at two spaced joints along each side thereof.

Mounted above the upper end of laser 55 on the back of plate 31 is a right angular bracket having a first leg 71 (FIGS. 4 and 6) secured against the underside of plate 31 by a bolt 72, and having its other leg 73 protecting horizontally, as illustrated in FIGS. 2, 3, 4 and 6, above the upper end of laser 55. Bolts 72 pass through a vertical slot 74 (FIG. 4) in the plate 31, and a horizontal slot 75 (FIG. 6) in the bracket leg 71, so that brackets 71, 73 can be adjusted both vertically and horizontally on plate 31.

The bracket leg 73 is supported on the upper surface of an elongate leveling bar 76, opposite ends of which are supported on the upper ends of a pair of spaced adjusting nuts 77 (FIGS. 4 and 6) which are adjustably threaded through the horizontally disposed legs 78 of a pair of right angular brackets 79 that are fastened to the underside of cover 31 beneath and adjacent opposite ends of the leveling bar 76.

Mounted on the upper surface of the bracket leg 73 is a pair of spaced, parallel, rectangular supporting plates 81 and 82. A similarly shaped cover plate 83 is supported on the upper edges of plates 81 and 82. The upper and lower edges of plate 82 are welded or otherwise secured, respectively, to the plate 83 and to the bracket leg 73, while the plate 81 is secured by a pair of elongate bolts 85 to plate 82, so that plate 81 can be adjusted laterally on the bracket leg 73 toward and away from plate 82, and beneath the overlaying plate 83.

Mounted in confronting, circular recesses formed in the confronting faces of plates 81 and 82 are two, resilient, O-rings or bearings (not illustrated), which resiliently embrace opposite sides of a spherically shaped reflecting member 87. Member 87 has therein a diametral slot 88, the bottom of which has thereon a reflecting or mirror surface 89. Secured to and projecting from the outer, spherical surface of member 87, is a cylindrical adjusting stem 91, the axis of which extends through the center of member 87 and lies in a plane which intersects the mirror surface 89 at an angle of 45°. Stem 91 projects upwardly through an axial bore formed in the center of a hexagonally-shaped plate or ring 93, which is fastened on top of plate 83. Adjustably threaded through alternate sides of ring 93 are three adjusting screws 94, the inner ends of which are engageable with the stem 91 at intervals of 120° about its periphery.

Figure 5:
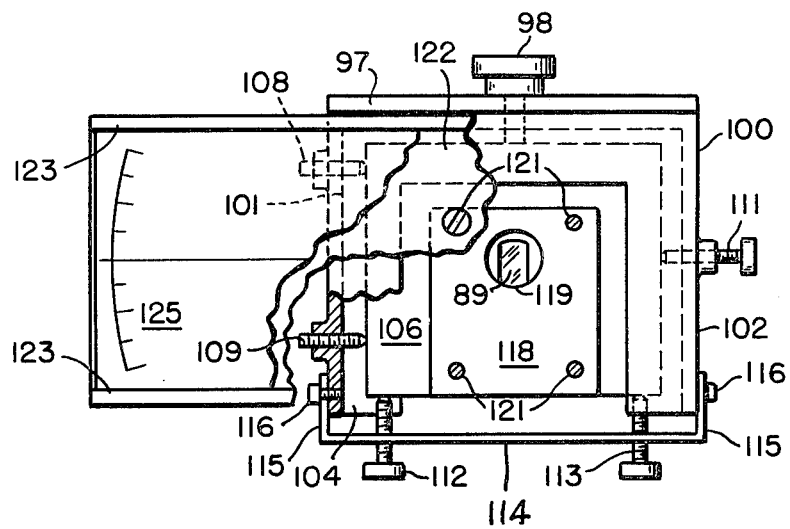
FIG. 5 is an enlarged elevational view of the alignment chart and inclined beam reflecting mirror that are carried on the upper end of the pivotal housing cover as seen when looking in the direction of arrows 5—5 in FIG. 4.
Figure 6:
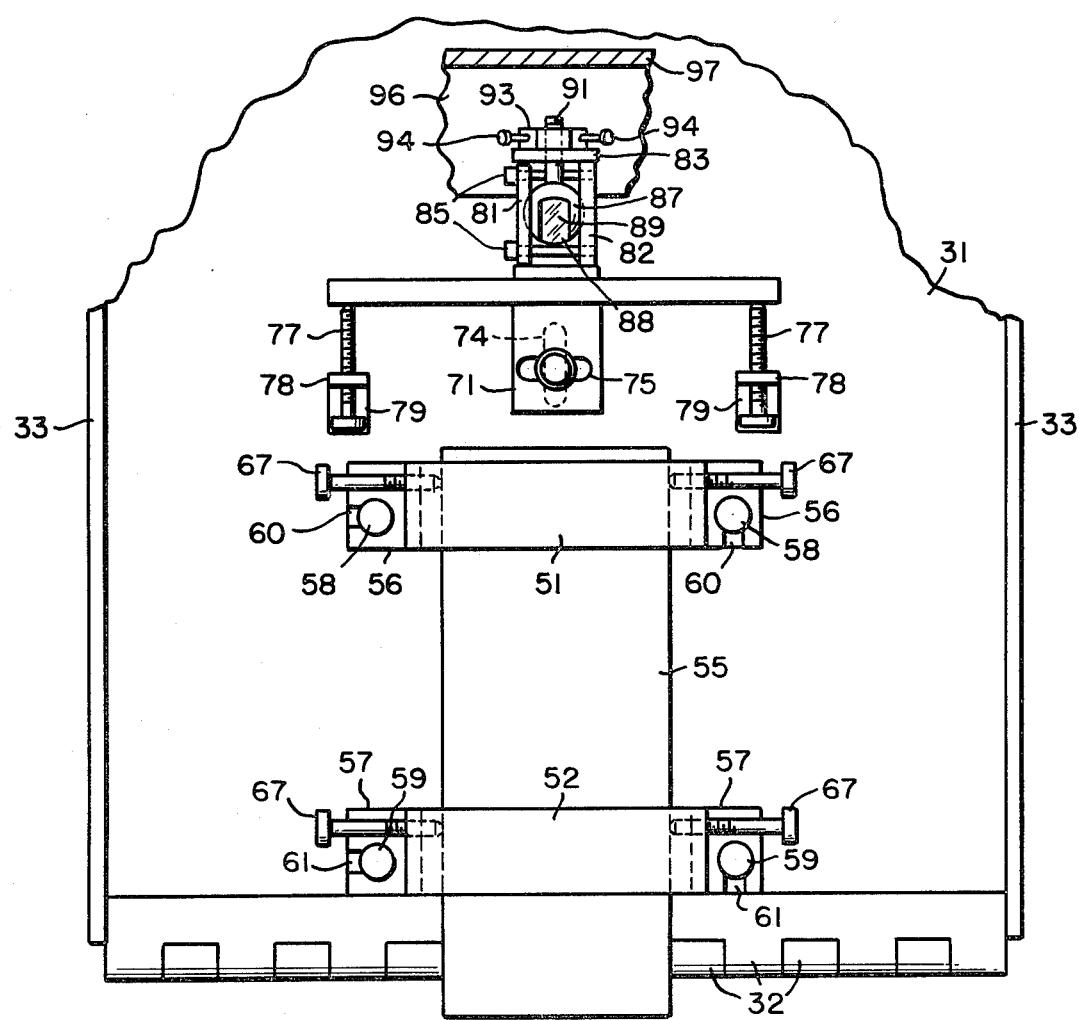
FIG. 6 is an enlarged, fragmentary sectional view taken along the line 6—6 in FIG. 4 looking in the direction of the arrows.

One leg 96 of another right-angular bracket is secured to the rear face of cover 31 above the bracket 71, 73 and has a horizontally disposed leg 97 (FIGS. 4 and 5), which extends over the top of the mounting apparatus for the mirror surface 89. Secured by a nut 98 to the underside of the bracket leg 97 to be suspended thereby in front of the mounting device for mirror 89 is an inverted, generally U-shaped frame 100, which has a pair of spaced, parallel, downwardly projecting legs 101 and 102. Adjustably mounted in a groove 104, which is formed completely around the inside surface of the U-shaped bracket 100, is a rectangular, chart-supporting plate 106, which has in approximately the center thereof a large circular opening 107 (FIG. 4) that registers with the mirror reflecting surface.

Plate 106 is engaged along one side edge by a pair of set screws 108 and 109, which thread through leg 101 into engagement with the confronting side of plate 106, and along its opposite edge by the inner end of a single adjusting nut 111, which is threaded through the frame leg 102 approximately medially of its ends. Plate 106 is also supported along its lower edge on the upper ends of two, spaced, parallel supporting screws 112 and 113, which are adjustably threaded through a horizontally disposed supporting strap 114 which extends along the bottom of frame 100. Opposite ends of strap 114 are bent upwardly as at 115, and are secured by screws 116 to the outer surfaces of the frame legs 101 and 102 at the lower ends thereof, whereby strap 114 is suspended horizontally beneath frame 100.

Mounted on the face of plate 106 at its side remote from the mirror 89 is a spacer plate 118, which has in its upper end a large circular opening 119 which registers with, and has the same diameter as, the opening 107 in plate 106. Secured intermediate its ends by a plurality of screws 121 (four in the embodiment shown in FIG. 5) against the face of plate 118 is an elongate, sheet metal card holder 122, which is generally rectangular in configuration. Slidably mounted between the rolled or curled edges 123 of the holder 122 is a conventional alignment chart or card 125 having on the face thereof the usual graduations for denoting toe in, toe out, camber, etc. In its center, this card 125 has a small opening or hole H, which may be approximately 1/16 of an inch in diameter, and which registers with the centers of the openings 107 and 119 in the plates 106 and 118, respectively, and consequently approximately with the center of the inclined mirror surface 89.

Referring now to FIG. 7, two collapsible devices 11 are adapted to be mounted in spaced recesses in the floor of a garage, or the like, so that the two cover sections 25 thereof, when closed, will be positioned to support thereon the two front tires FT of an automotive vehicle. Each housing, of course, is properly mounted in its associated recess so that the cover sections 25 and 31 will be disposed horizontally and approximately at ground level when they are closed, and so that the charts 125 of the two devices will confront one another as shown in FIG. 7, when the covers 31 are elevated to their operative positions.

Before any alignment operations are conducted, the lasers 55 and charts 125 must be properly oriented, so that when the covers 31 are in their operative positions the beams from the two lasers 55 will be directed vertically upwardly onto the inclined mirror surfaces 89 of their associated reflecting members 87, and will be reflected by these mirror surfaces toward one another along a common horizontal axis. This initial calibration can be effected by employing a pair of identical fixtures 130 (FIGS. 7 and 8), each consisting of a rigid plate having in its upper end (FIG. 8) a small opening 131, and in its lower edge a pair of spaced, parallel slots 132. Each fixture 130 is adapted to fit slidably and snugly over opposite sides 14 and 15 of a housing 11 to support fixture 130 in a vertical plane on the end of the housing opposite the associated chart 125, as shown for example by broken lines in FIG. 7. When the fixtures 130 are in their operative positions as shown in FIG. 7, their openings 131 will be positioned on the horizontal line or axis along which it is desired coaxially to locate the two laser beams that are to be used for alignment purposes.

With the fixtures 130 in place (FIG. 7), the laser beam adjusting nuts 58, 59 and 67 of each device are adjusted until the associated laser beam is directed upwardly and approximately onto the center of the associated mirror surface 89, which is located above the laser in a plane that extends at approximately 45° to the vertical. Each beam should then be directed by the associated mirror surface laterally through the registering openings 107 and 119 in the adjacent card supporting plates 106 and 118, and through the small hole H in the center of the associated chart 125 toward the adjacent fixture 130. If a respective laser beam is properly aligned its beam, as reflected horizontally by the associated reflecting surface 89, should fall directly on the openings 131 in both fixtures 130. If one of the beams is not so located, its associated mirror 89 can be adjusted by loosening the bolt 72 to allow lateral adjustment of its bracket leg 71 horizontally as allowed by the slot 75, or vertical adjustment in slot 74 by the adjusting screws 77, until such time that the beam from the associated laser 55 is located approximately centrally of the mirror surface 89. If the reflected beam still does not fall directly on the fixture openings 131, the fine adjusting screws 94 for each mirror mount can be manipulated to swing the associated mirror surface 89 slightly in whatever direction necessary to focus the reflected beam directly through both openings 131 in the fixtures.

After the above adjusting or calibrating operations have been effected the bolts 85 of each mirror housing are tightened firmly to hold the associated reflecting member 88 against further movement therein. Also, if necessary the set screws 109 and the adjusting screws 111, 112 and 113 can also be adjusted properly to align the small hole H in the associated chart 125 with the center of the adjacent reflecting surface 89. Moreover, the associated chart 125 can, if necessary, be shifted slightly longitudinally within its supporting frame 122. In any event, once these initial adjustments have been made to place the reflected laser beams coaxially of one another, the apparatus is ready for use in alignment operations. At this time, therefore, the fixtures 130 can be removed and saved for future use.

Referring now to FIG. 7, to effect alignment of the front wheels of an automobile the auto is driven onto the floor F of a garage until its two front tires FT are positioned on the housing covers 25 between the associated cover ribs 27. The covers 31 are then swung upright, and the auto is elevated, for example by a one or two post-type lift L mounted telescopically in floor F, in order to lift the wheels off of covers 25 so that they can be slid sideways to expose the associated wheel pads 41. The auto is then lowered until each of its front tires FT come to rest on one of the two support pads 41. (See also for example, the tire T in FIG. 2.) It will be noted that the axes of pads 41 intersect the beams emanating from lasers 55. Also, when section 25 is in its open position (FIG. 2) it provides a work platform upon which the operator of the equipment may stand during calibration, etc.

Mounted on the floor F of the garage adjacent one of the rear tires RT of the auto is a pivotal alignment device comprising a pair of upright supports 161 and 162 (FIGS. 2 and 7), which are slidable at their lower ends in a track 163 formed in the floor F and extending in a direction normal to the axis of the laser beams generated by devices 11. Pivotally connected to the upper ends of the supports 161 and 162 by a pair of rigid links 165 and 166, which are equal in length, is an elongate centering member 167. This member has a vertically disposed face 168, which is held by the links in a plane that extends at right angles to the above-noted laser beams, and which is engageable with the outer peripheral surface of one of the rear tires RT (the left rear tire in FIG. 7) of the vehicle when its front wheels are positioned on the pads 41. When the surface 168 on member 167 is seated flat against the outer peripheral surface of this tire RT, the centerline of the automobile will be disposed approximately at right angles to the axis of the laser beams generated by devices 11; but if the automobile is slightly off center, i.e., the rear axle is not parallel with the coaxial laser beams, then the surface 168 will be inclined relative to the outer surface of the rear tire RT with which it is engaged. To correct this inclination, one need only to push the front end of the auto either to the left or to the right, as may be necessary, thereby causing the pad-supporting plates 43 to shift laterally, and thus shifting the front end of the auto until the surface 168 lies flat against the outside of the engaged tire RT as shown in FIG. 7.

When the automobile is thus properly aligned, a mirror mounting device, such as the type shown for example in U.S. Pat. No. 3,758,213, is employed to attach a mirror or reflecting member 170 (FIG. 7) to the outside surface of each of the two front tires FT, so that the beams of light from the associated lasers 55 are directed rearwardly back onto the associated charts 125.

From this point on each of the mirrors 170 is adjusted in known manner to place its reflecting surface in a plane that extends at right angles to the axis of rotation of the associated tire FT. For this purpose it will be necessary to elevate the front wheels of the vehicle, as for example by the lift L or some other conventional auto lift or jacking device, so as to enable the front wheels of the vehicle to be rotated about their respective spindles. Then, after each mirror 170 has been properly aligned with the axis of rotation of its associated wheel, the the front wheels are lowered and the reflected laser beams can then be employed to read on the face of the charts 125 the necessary measurements relating to toe in, toe out, camber, etc. The front wheels can then be adjusted as desired, after which the automobile can be removed and the cover sections 25 and 31 of each device 11 can be returned to their closed positions.

In order properly to adjust the front wheels of an auto it is often desirable to have the wheels elevated slightly, so that an operator or mechanic will have easier access to the fittings which require adjustment. For this reason the modified housing 11' shown in FIGS. 9 and 10 may be employed in place of housings 11. The modified housing 11' is similar in all respects to housing 11 except that its wheel supporting pad 41 is mounted for limited vertical movement between its usual or lowered position as shown by solid lines in FIGS. 9 and 10, and an elevated position (broken lines in FIG. 9) in which the pad 41 is locked in a horizontal position some twelve to fourteen inches above its normal, lowered position.

Referring to FIGS. 9 and 10, the numeral 180 denotes generally a pneumatically controlled scissors jack comprising a pair of spaced, parallel, upper links 181, the upper surfaces of which are welded or otherwise secured to the underside of plate 43 adjacent the longitudinal side edges thereof. A first horizontal pin 182 is mounted at opposite ends thereof for reciprocation in a pair of elongate slots 183 formed in the registering ends of links 181 adjacent one end of plate 43; and the opposite ends of links 181 are connected by an elongate pin 184. A second, lower pair of spaced, parallel links 185, which are similar to links 181, are suspended horizontally beneath links 181 by two sets of links 186 and 187. A pin 188 is mounted at opposite ends for reciprocation in slots 189 in links 185 for reciprocation in a manner similar to pin 182; and the opposite ends of links 185 are connected by an elongate pin 190. The two links 186, 187 of each set thereof are pivotally connected intermediate their ends by pins 192; and adjacent each side of jack 180 the link 186 is pivotally connected at opposite ends to the pins 184 and 188, respectively, and the link 187 is pivotally connected at opposite ends to pins 182 and 190, respectively.

Each jack 180 is operated by an air cylinder 195, which is fixed at one end to pin 190 intermediate its ends, and which has its reciprocable piston rod 196 secured at its free end to pin 188, so that when air pressure is applied to the cylinder, it retracts its rod 196, thereby drawing pin 188 to the right (FIG. 9) in slots 189 relative to links 185. This elevates plates 43 off the bearings 45 and into its elevated position as shown by broken lines in FIG. 9. Two hook members 197, which are pivoted on links 181 and 185 adjacent the inner ends of slots 183 and 189, can then be swung into locking positions in which notches 198 in the free ends thereof engage over opposite ends of pins 182 and 188 to lock plates 41 and 43 in their elevated positions.

The above-noted jack 180 is not intended to elevate the front end of an auto, but merely to hold it in an elevated position after it has been raised by a floor lift such as denoted at L in FIG. 7. Thus, when two such housings 11' are employed, and after the mirrors 170 have been properly trued or centered, the lift L is operated to elevate the auto, the jacks 180 are then operated to elevate pads 41 to their upper positions (broken lines in FIG. 9) and the lift is then lowered just far enough to cause the front tires FT to engage pads 41 with sufficient force to compress the front wheel springs. The necessary alignment adjustments may then be made.

From the foregoing it will be apparent that the invention disclosed herein provides extremely compact and reliable apparatus for effecting the static alignment of the front wheels of an automotive vehicle or the like. Since the novel devices 11 or 11' can be completely stored beneath the surface of the floor F of a garage, when not in use, they are protected from damage resulting from jarring, bumping, or the like. This means also that once the various elements are adjusted into their properly calibrated positions, they remain so in the absence of any accidental damage thereto during use. Moreover, not only are the steps for calibrating the laser beams relatively easy to effect, but also the adjusting devices are readily accessible when the cover 31 is in its operative position.

An additional and important advantage of this novel aligning apparatus is that, unlike prior devices wherein it was customary to have the laser aligned horizontally with the associated chart upon which the readings are made, in which case the lasers must be positioned outwardly at opposite sides of the installation with the chart holding devices positioned inwardly thereof, the laser in this new device is positioned beneath the inclined reflecting mirror 89, so that it is possible to position the associated chart 125 substantially closer to the laser, thereby reducing the overall width of the installation. It should be noted also that this novel apparatus includes both coarse and fine adjusting features, as for example in the case of the respective housings for the reflecting members 87, which can be adjusted both by adjusting the supporting bracket leg 73, and by effecting fine adjustments through the rotation of the reflecting member 87 into its final position by the adjusting screws 94.

Furthermore, by employing apparatus which incorporates the pad elevating jacks 180, the mechanic has the additional advantage of being able to make alignment adjustments while the auto is elevated slightly above ground level. At this stage, assuming the lift L is employed, the frame of the auto will be resting on the now-slightly-elevated lift so that the rear wheels also will be off the floor, but the front wheels will be resting on the elevated pads 41. With this construction, of course, the lasers 55 and their associated mirror surfaces 89 and charts 125 will be adjusted slightly vertically on their respective cover sections 31 properly to register with the elevated front wheels of the vehicle.

Another advantage of this modified structure is that the lower links 185 of each jack are unloaded and are spaced slightly above the bottom of the associated housing 11', when collapsed or lowered, so that the plate 43 attached to the jack will have its marginal edges resting on bearings 45 to allow the plates 43 to be shifted laterally to effect proper alignment of the rear axle by use of member 167. Of course when the pads 41 are engaged by the wheels of an auto, the bottom of each jack 180 will be resting firmly on the bottom of its associated housing so that the jacks will not be movable relative to the housings, when being used.

While this invention has been described in connection with only certain embodiments thereof, it will be apparent that it is capable of still further modification, and that this application is intended to cover any such modification that may fall within the scope of one skilled in the art, or the appended claims.

Having thus described my invention, what I claim is:

1. Apparatus for use in aligning the front wheels of automotive vehicles, comprising
    a housing adapted to be mounted on a garage floor, or the like, and having an opening in a top portion thereof defining a plane,
    means for covering said opening in the top portion of said housing, including a first cover movable on said housing between a closed position in which a plane surface thereon registers approximately with the top portion of the housing to cover at least one portion of said opening, and an upright position in which said first cover extends above said housing, and
    alignment checking means including a light source mounted on said first cover to be supported thereby within a first section in said housing and beneath the top portion of said housing, when said first cover is closed, and to be supported thereby in an operative position above said housing, when said first cover is in its upright position,
    said alignment checking means further including means for directing a beam of light from said source substantially horizontally and at a height sufficiently above the housing to cause the beam to be directed toward the approximate center of a wheel of an adjacent automotive vehicle, or the like, when said first cover is in its upright position.

2. Apparatus as defined in claim 1, including
    wheel-supporting means mounted in a second section of said housing in registry with another portion of said opening, and
    a second cover slidably mounted on said housing for movement between a first position in which it covers said wheel supporting means, and a second position in which it uncovers said wheel-supporting means and covers said first section of said housing.

3. Apparatus as defined in claim 2, wherein said wheel supporting means comprises
    a first member mounted in said housing for limited reciprocable movement parallel to said beam of light projected by said source when said first cover is in its upright position, and
    a second member rotatable on said first member about a vertical axis which intersects the last-named beam of light, said second member being disposed to support in the path of said beam one of the front wheels of an automotive vehicle, when said second cover is in its second position.

4. Apparatus as defined in claim 3, including means in said housing for elevating said first and second members as a unit from a lowered position in which said members are disposed within said housing to an upper position in which said members are spaced above the top portion of said housing.

5. Apparatus as defined in claim 4, wherein said elevating means comprises
    a scissors-type mechanism secured to the underside of said first member for reciprocable movement therewith in said housing parallel to said beam of light, when said members are in their lowered positions, and
    means on said mechanism for selectively moving said mechanism between expanded and retracted positions, respectively to raise and lower said members into and out of their upper positions.

6. Apparatus as defined in claim 1, wherein
    said first cover is hingedly connected along one edge thereof to said housing to pivot between its closed and its upright positions, respectively,
    said light source is mounted on one side of said first cover to be suspended from the underside thereof in said first section of the housing, when said first cover is in its closed position, and to direct a beam of light in a direction transverse to the horizontal, when said first cover is in its upright position, and
    said light directing means comprises at least one reflecting member mounted on said one side of said first cover and having thereon a reflecting surface positioned in the path of the last-named beam, and operative to reflect said beam in a horizontal direction when said first cover is in its upright position.

7. Apparatus as defined in claim 6, including
    means adjustably mounting said light source on said first cover to direct a beam vertically when said first cover is in its upright position,
    means adjustably mounting said reflecting member on said first cover with its reflecting surface disposed in a plane inclined at approximately 45° to the vertical, when said first cover is in its upright position, and
    a chart carried by said first cover adjacent said reflecting surface and having therethrough a small opening registering approximately with the center of said reflecting surface and the beam of light reflected therefrom, said chart being disposed to face in the direction of the wheel of the vehicle toward which said horizontal beam of light is to be directed.

8. Apparatus as defined in claim 7, wherein
said reflecting member comprises a spherically-shaped element having therein a diametral slot,
the bottom of said slot is a plane surface having thereon said reflecting surface, and
said mounting means for said reflecting member includes a pair of ring bearings supporting said spherically-shaped member for universal rotational adjustment about its center.

9. Apparatus as defined in claim 8, including
a ring mounted on said first cover adjacent said reflecting member and having therethrough a vertical bore disposed coaxially of said reflecting member,
a cylindrical stem projecting from said reflecting member through said bore in said ring in radially spaced relation to the wall of said bore, and
a plurality of adjusting screws mounted in said ring and projecting radially at their inner ends into contact with the periphery of said stem.

10. Apparatus as defined in claim 6, including
a first pair of clamps adjustably secured to said one side of said first cover adjacent the hinged edge thereof and operatively engaged with said light source to hold the latter in a position in which the beam of light therefrom is directed vertically upwardly when the first cover is in its upright position,
a bracket adjustably secured to said one side of said first cover adjacent said light source and having one leg projecting at right angles to said first cover and transversely of the beam of light from said source, and
means mounting said reflecting member on said bracket with its reflecting surface registering through an opening in said one bracket leg and being disposed in a plane extending approximately 45° to the vertical when said first cover is in its upright position, thereby to reflect said beam horizontally over one end of said housing toward the front wheel of a vehicle.

11. Apparatus as defined in claim 6, including
a wheel-supporting pad mounted in said housing adjacent said one end thereof for rotation about a vertical axis which intersects the horizontal beam of light reflected by said reflecting surface, when said first cover is upright, said pad having a wheel-supporting surface disposed approximately parallel with the floor on which said housing is mounted, and
a second cover mounted on said housing for movement into and out of a closed position in which it is positioned over said pad and approximately level with the top of said housing thereby to cover said pad.

12. Apparatus as defined in claim 11, including means mounting said pad for vertical reciprocation into and out of a raised position in which its wheel-supporting surface is maintained in an elevated position above the top portion of said housing.

13. Alignment apparatus for checking the alignment of the front wheels of an automotive vehicle, comprising
a pair of housings mounted on the floor of a garage, or the like,
a wheel-supporting pad mounted in each of said housings adjacent one end thereof for limited reciprocable adjustment horizontally toward and away from said one end of the housing,
said one ends of said housings facing toward each other, and said pads being horizontally adjustable selectively to support thereon the two front wheels of automotive vehicles of different widths,
collapsible alignment checking means mounted in each of said housings adjacent the end thereof remote from the end containing the associated wheel-supporting pad, and
means mounting said alignment checking means on said housings for movement between collapsed positions in which each said alignment checking means is enclosed within its respective housing, and upright positions in which each of said alignment checking means is located in an operative position above the associated housing,
said alignment checking means including a pair of spaced light sources operable, when said alignment checking means are in their upright positions, to direct two beams of light toward each other horizontally on a common axis which extends above and centrally across said pads in said housings.

14. Alignment apparatus as defined in claim 13, wherein said mounting means comprises
a pair of plates each of which is hingedly mounted along one edge to a different one of said housings for pivotal movement between upright positions in which said plates extend transversely to the floor above said housings, and closed positions in which said plates rest horizontally on said housings to cover portions of the upper ends of the housings adjacent said pads, and
means adjustably fastening said two light sources to said plates to be suspended thereby within said housings adjacent said pads, when said plates are in their closed positions, and to be supported to direct beams of light vertically, when said plates are in their upright positions.

15. Alignment apparatus as defined in claim 14, wherein said alignment checking means includes
a reflecting surface mounted on each of said plates to extend transverse to the beam of light emanating from the associated light source, and disposed in a plane disposed at 45° to the vertical, when the associated plate is in its upright position, and
a chart mounted on each plate in spaced, registering relation with the associated reflecting surface and having therein a small opening through which the reflected beam of light is directed by the adjacent reflecting surface.

16. Alignment apparatus as defined in claim 13, including
means mounting said wheel-supporting pad in each housing for limited vertical movement between lowered positions in which said pads are disposed within their respective housings, and elevated positions in which said pads are spaced above the upper ends of said housings, and
means in each housing for releasably locking said pads in their elevated positions.

17. Alignment apparatus as defined in claim 16, including
a pair of members each hingedly connected to a different one of said housings for pivotal movement into and out of operative positions in which said members extend transversely to the floor above said housings to direct said light beams onto the approximate centers of the front wheels of a vehicle supported on said wheel-supporting pads, when the latter are in their elevated positions.

* * * * *